United States Patent
Crawford

[15] 3,695,398
[45] Oct. 3, 1972

[54] BRAKE SHOE HOUSING AND RETAINER MEANS

[72] Inventor: Peter F. Crawford, Leamington Spa, England

[73] Assignee: Automotive Products Company Limited, Leamington Spa, England

[22] Filed: June 22, 1970

[21] Appl. No.: 48,173

[30] Foreign Application Priority Data

June 24, 1969 Great Britain..........31,863/69

[52] U.S. Cl.................................................188/73.6
[51] Int. Cl..................................................F16d 65/02
[58] Field of Search..........24/73 BC; 188/73.3, 73.6, 250 G

[56] References Cited

UNITED STATES PATENTS

| | | | |
|---|---|---|---|
| 3,357,524 | 12/1967 | Smith | 188/73.6 |
| 3,189,129 | 6/1965 | Burnett | 188/73.6 |
| 3,545,575 | 12/1970 | Pinnhammer | 188/73.6 |

FOREIGN PATENTS OR APPLICATIONS

| | | | |
|---|---|---|---|
| 614,125 | 2/1961 | Canada | 188/73.3 |

Primary Examiner—George E. A. Halvosa
Attorney—Lawrence J. Winter

[57] ABSTRACT

In a disc brake including pads simultaneously urged against opposite sides of a brake disc by applying means, the pads being carried by a channel-shaped housing which embraces the periphery of the brake disc, the brake pads are retained in the channel of said housing to prevent their rotation with the brake disc by end members which extend over the gaps between the side walls of the channel and the brake disc, one of said end members being retained in position by latch means so as to be readily detachable from the housing to allow removal and replacement of the brake pads.

6 Claims, 4 Drawing Figures

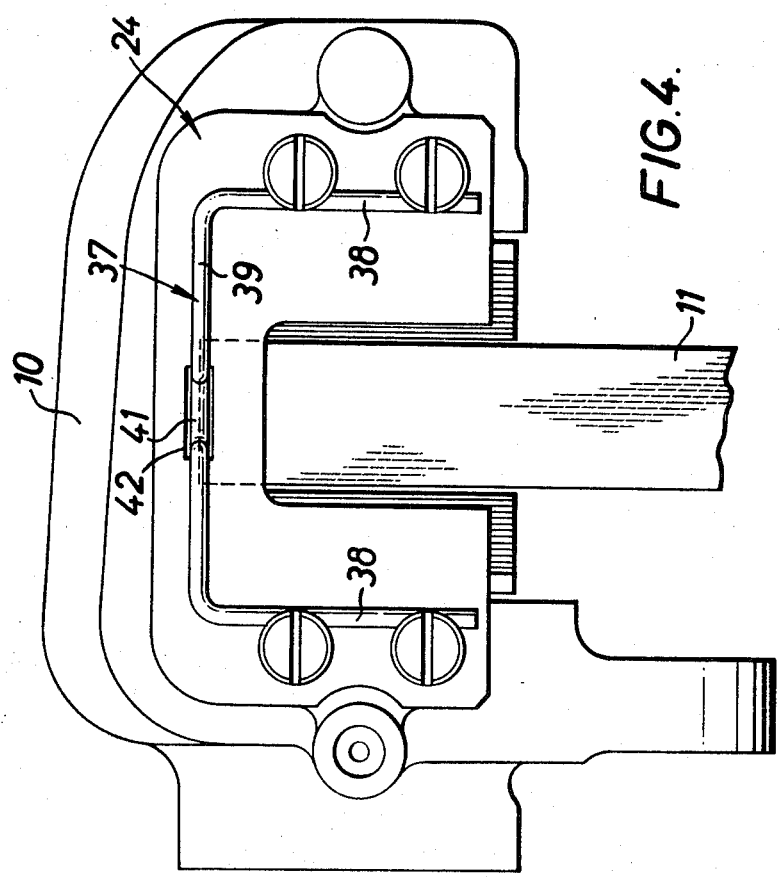

BRAKE SHOE HOUSING AND RETAINER MEANS

This invention relates to disc brakes of the kind in which a disc rotating with a wheel, or other rotating member to be braked, has associated with it at least one pair of brake pads which, to apply the brake, are pressed against opposite sides of the disc, the pads being restrained against rotary movement with the disc and being mounted in a housing which extends across the periphery of the disc and is held against movement around the disc axis. The housing may be fixed in position, the pads being urged against the disc to apply the brake by separate applying means, or the housing may be slidable in a direction parallel to the disc axis, a single applying means acting between one pad and the housing urging that pad towards the disc and exerting a reaction force on the housing which in turn urges the other pad against the disc.

According to the present invention, in a disc brake of the kind referred to and having the housing which carries the brake pads in the form of a channel-shaped member embracing the periphery of the brake disc, the brake pads being positioned one between each side wall of the channel-shaped member and the brake disc, the said pads are retained in the channel-shaped member by end members which extend over the gaps between the side walls of the channel-shaped member and the brake disc, one of the said end members being retained in position by latch means so as to be readily detachable from the housing.

The term 'latch means' is to be understood as meaning any readily releasable holding means including a component or components movable by sliding or rotation to engage and interlock with co-operating fixed parts and releasably held in the interlocking position.

Preferably, the said one end member is a plate located on studs projecting from one end of the housing, the studs being grooved or notched to receive edge portions of latch components slidably mounted on the said plate and urged by resilient means to engage the said grooves or notches.

The invention will now be described by way of example, with reference to the accompanying drawings in which:

FIG. 4 is an end view, similar to FIG. 3, showing a modified latch means for the detachable end member.

Figure 1:
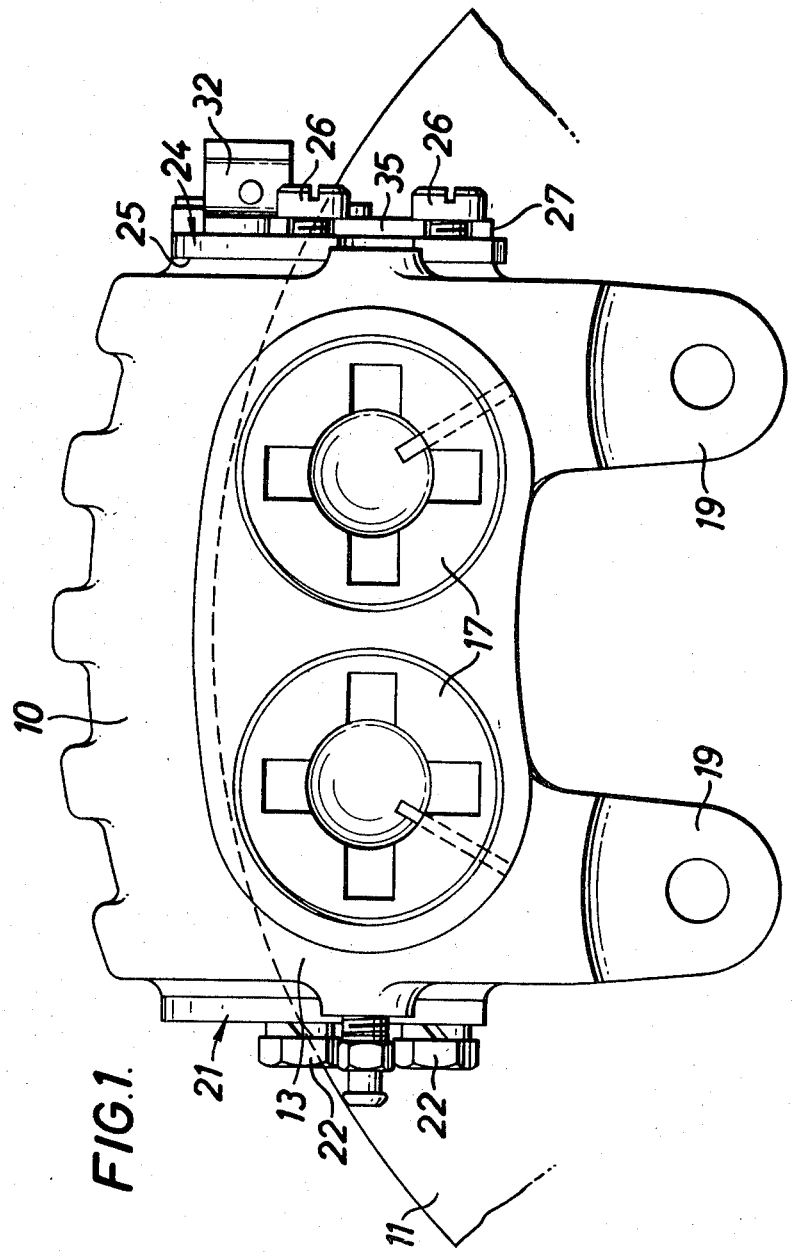
FIG. 1 is a side view of a brake pad supporting housing showing one arrangement of releasable holding means for one of the end members.
Figure 2:
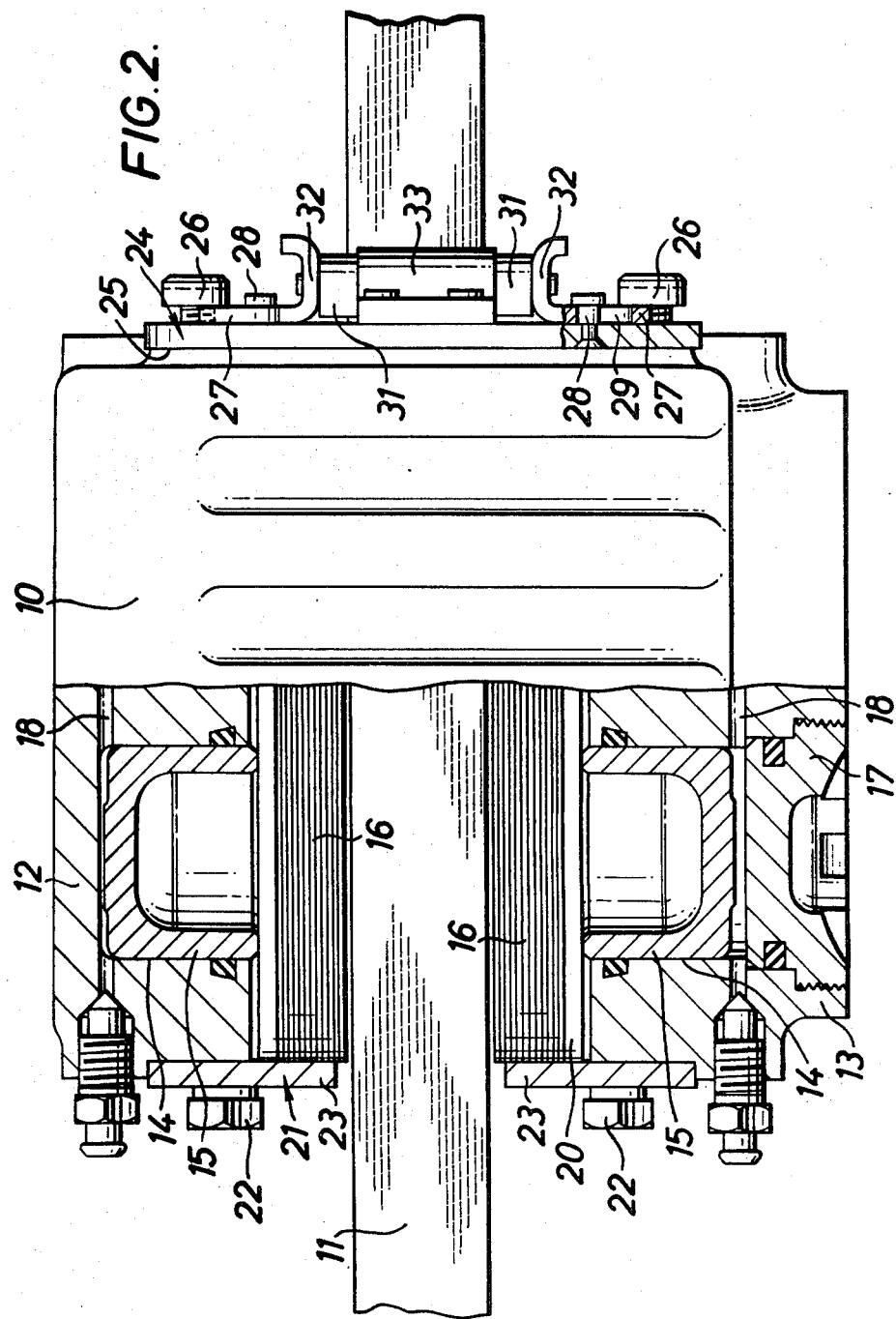
FIG. 2 is a plan view with parts in section.
Figure 3:
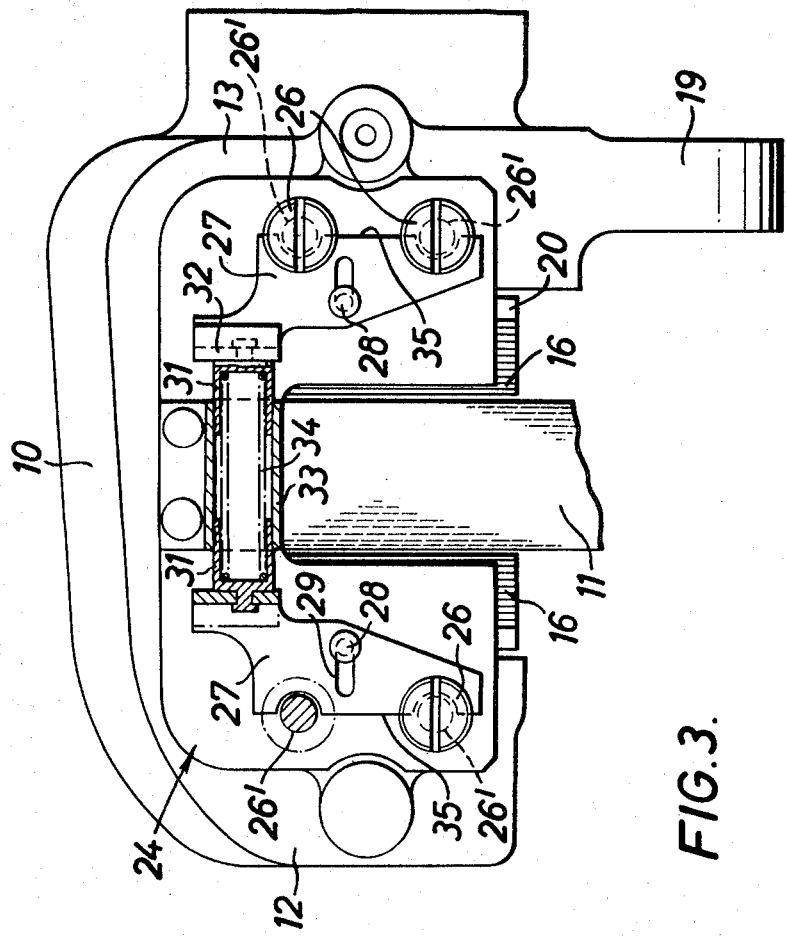
FIG. 3 is an end view, also with parts in section.

Referring to FIGS. 1, 2 and 3 of the drawings the brake pad supporting housing 10 is of channel section as shown in FIG. 3 and is adapted to receive, a brake disc 11 with which the pads of the brake co-operate between the side walls 12 and 13 of the said channel section, the housing bridging the outer peripheral portion of the brake disc. Each of the side walls 12 and 13 is formed with two side-by-side bores, one bore in each wall being shown at 14 in FIG. 2, to receive pistons 15 acted on by fluid pressure to apply brake pads 16, mounted between the inner faces of the walls 12 and 13 and the brake disc 11, to the said brake disc. While the housing 10 shown in the drawing has two cylinder bores 14 in each wall, a single bore, or more than two bores, may be provided in each wall. The or each bore 14 in the wall 12 is a blind bore extending from the inner face of that wall, and is co-axial with a through bore 14 in the wall 13, the outer end of the bore 14 in the wall 13 being closed by a screw-threaded plug 17. Passages, parts of which are shown at 18 in FIG. 2, provide for the supply of fluid under pressure to the bores 14 to urge the pistons 15 inwardly. Lugs 19 projecting from the wall 13 are provided with holes to receive bolts for securing the housing to a fixed part of a vehicle structure adjacent a wheel with which the brake disc rotates.

The brake pads 16 are mounted on metal backing plates 20.

At one end of the housing 10, a flat end plate 21 is secured to a flat end surface of the said housing by bolts 22, the said end plate being U-shaped to embrace the edge of the brake disc 11, and having portions 23, FIG. 2, which extend inwardly beyond the inner faces of the walls 12 and 13 to provide abutments, at that end of the housing for the adjacent ends of the brake pads 16.

A similar flat end plate 24 is releasably mounted against a flat end surface 25 at the other end of the housing, being retained in position against the flat surface 25 by latch means which will now be described.

Four headed studs 26 are mounted in screwthreaded holes opening into the flat surface 25, the end plate 24 being formed with four holes 26' spaced and dimensioned so as to pass over the heads of the studs 26. The undersides of the heads of the studs 26 provide surfaces facing towards the housing.

Slidably mounted on the outer side of the end plate 24 are two latch components 27 guided for rectilinear movement by cup-shaped members 31 fixed to upturned ears 32 on the latch components and sliding in a tube 33 fixed to the end plate 24. A spring 34 in the tube 33 urges the components 27 in opposite directions to cause notched edge portions 35 thereof to engage the undersides of the heads of the studs 26 thus retaining the end plate 24 in position against the end face 25 of the housing 10. The sliding movement of the latch components 27 is limited by pins 28 fixed in the plate 24 and engaging in slots 29 in the said components, thus preventing the spring 34 from pushing the cup-shaped members out of the tube 33.

It will be apparent that the end plate 24 can be readily detached from the housing 10 by pressing the ears 32 towards each other, for example by means of a pair of pliers or a similar tool. The said ears 32 may have their outer ends bent over as shown at 36 in FIG. 2 to facilitate their being gripped by the pliers.

The replacement of the brake pads is effected by removing the plate 24, sliding out the old brake pads in the direction of the length of the channel, and sliding in the new brake pads. Thus the replacement of the brake pads is a very simple operation and can be very quickly performed, which is especially advantageous in the case of racing cars, on which the brake pads may have to be changed during a race.

The end plates 21 and 24 support the brake pads against movement due to the drag exerted thereon during operation of the brakes, and support the side walls of the housing 10 against spreading under the brake applying load.

In the arrangement shown in FIG. 4 of the drawings, the end plate 24 is retained in position on the housing 10 by a latch member comprising a length of resilient metal wire 37 bent to define three sides of a rectangle, the portions defining two opposite sides 38 of the rectangle engaging between the end plate 24 and the undersides of the heads of the studs 26. The third side 39 of the rectangle, which connects the sides 38, has its central portion 41 curved or otherwise shaped so as to be offset from the plane of the rectangle, and a slot 42 is provided in the end plate 24 into which the said offset central portion 41 snaps when the latch member is engaged with the studs, to hold the said latch member in position. The latch member is released by lifting the said offset portion out of the slot and sliding the latch member clear of the studs.

In the embodiment of the invention above described, the housing 10 is designed to be fixed in position, each brake pad being moved relative to the housing to apply it to the brake disc. It will be evident that the invention may also be used in disc brakes in which the housing is slidable in the direction of the axis of the brake disc, one pad being supported by an abutment on the housing and the other brake pad being moved relative to the housing to apply it to the disc, the reaction exerted by the applying means on the housing applying to the disc the brake pad which is supported by the abutment on the housing.

I claim:

1. A disc brake comprising a channel shaped housing with opposite side walls having gaps therein for receiving a brake disc therein, a pair of brake pads disposed in said housing on opposite sides of a brake disc received therein, a first end plate closing off the gap in one side wall and a detachable second end plate closing off the gap in the opposite side wall of said housing to maintain said brake pads therein, said housing having projecting stud heads thereon adjacent said second plate for receiving said second plate thereon, said second plate having openings therein of larger dimension than said stud heads for permitting quick detachment of said second plate for replacement of worn brake pads, and slidable latch means disposed between said stud heads and second plate, and holding means positioned between said latch means for constantly maintaining said latch means engaged between said stud heads and second plate.

2. The brake of claim 1 wherein said latch means have guide means for rectilinear sliding movement on said second plate, and said latch means have resilient biasing means urging them in opposite directions away from each other.

3. A disc brake of claim 2, wherein the latch means are guided at least in part by members fixed thereto and slidably located on opposite ends of a tube carried by the second plate, the resilient means comprising a compression spring mounted in said tube between the said members.

4. A disc brake of claim 3, wherein the said members are cup-shaped and the compression spring extends into said cup-shaped members.

5. A disc brake of claim 4, wherein the latch means are provided with ears projecting away from said second plate for engagement by a tool to compress the spring and release the latch means.

6. A disc brake of claim 5, wherein each of the latch means is notched to receive the stud head with which it engages.

* * * * *